(12) United States Patent
Del Rio Castillo et al.

(10) Patent No.: US 10,407,308 B2
(45) Date of Patent: Sep. 10, 2019

(54) EXFOLIATION OF LAYERED MATERIALS BY WET-JET MILLING TECHNIQUES

(71) Applicant: FONDAZIONE ISTITUTO ITALIANO DI TECNOLOGIA, Genoa (IT)

(72) Inventors: Antonio Esau Del Rio Castillo, Genoa (IT); Alberto Ansaldo, Genoa (IT); Vittorio Pellegrini, Gragnano (IT); Francesco Bonaccorso, Genoa (IT)

(73) Assignee: FONDAZIONE ISTITUTO ITALIANO DI TECHNOLOGIA, Genoa (IT)

( * ) Notice: Subject to any disclaimer, the term of this patent is extended or adjusted under 35 U.S.C. 154(b) by 0 days.

(21) Appl. No.: 15/777,733

(22) PCT Filed: Nov. 24, 2016

(86) PCT No.: PCT/IB2016/057108
§ 371 (c)(1),
(2) Date: May 21, 2018

(87) PCT Pub. No.: WO2017/089987
PCT Pub. Date: Jun. 1, 2017

(65) Prior Publication Data
US 2018/0370802 A1 Dec. 27, 2018

(30) Foreign Application Priority Data
Nov. 26, 2015 (IT) .................. 102015000077259

(51) Int. Cl.
*C01B 32/19* (2017.01)
*C01B 21/064* (2006.01)
(Continued)

(52) U.S. Cl.
CPC .............. *C01B 32/19* (2017.08); *B02C 19/06* (2013.01); *C01B 19/007* (2013.01);
(Continued)

(58) Field of Classification Search
CPC ......... C01B 32/19; B02C 19/06; B82Y 40/00; B82Y 30/00; C01P 2004/04; C01P 2002/82
See application file for complete search history.

(56) References Cited

PUBLICATIONS

Imai, Yusuke, Daisuke Shimamoto, and Yuji Hotta. "Effect of wet jet milling of carbon nanotube on electrical properties of polymer nanocomposites." Materials Chemistry and Physics 148.3 (2014): 1178-1183.*

(Continued)

*Primary Examiner* — Richard M Rump
(74) *Attorney, Agent, or Firm* — Thomas Horstemeyer, LLP (57) ABSTRACT

A system for the exfoliation of a layered material is described, comprising in combination: an exfoliation station (14-22) operating on a volume of a dispersion of a layered precursor material, including a wet-jet milling device (10); and a collecting station (30, 40), located downstream of the exfoliation station (14-22), operating on a volume of a dispersion of the at least partly exfoliated material, in which the exfoliation station (14-22) and the collecting station (30, 40) are connected to each other through a fluid communication path (20) along which there are interposed flow regulating means (50) adapted to assume a first operating configuration in which the communication path (20) between the exfoliation station (14-22) and the collecting station (30, 40) is discontinued, where the exfoliation station (14-22) is adapted to subject a volume of dispersion of layered precursor material to a predetermined number of wet jet milling cycles; and a second operating configuration in which the communication path (20) between the exfoliation (Continued)

station (14-22) and the collecting station (30, 40) is continuous, where the exfoliation station (14-22) is adapted to convey a volume of previously milled dispersion including at least partly exfoliated material to the collecting station (30, 40) and is placed in communication with a supply chamber (12) to be fed with a further volume of a dispersion of layered precursor material that has to be exfoliated.

20 Claims, 3 Drawing Sheets (51) Int. Cl.
*C01G 39/06* (2006.01)
*C01G 41/00* (2006.01)
*C01B 19/00* (2006.01)
*B02C 19/06* (2006.01)
*B82Y 30/00* (2011.01)
*B82Y 40/00* (2011.01)

(52) U.S. Cl.
CPC .......... *C01B 21/0648* (2013.01); *C01G 39/06* (2013.01); *C01G 41/00* (2013.01); *B82Y 30/00* (2013.01); *B82Y 40/00* (2013.01); *C01P 2002/82* (2013.01); *C01P 2004/04* (2013.01)

(56) References Cited

PUBLICATIONS

Tominaga, Yuichi, et al. "Wet-jet milling-assisted exfoliation of h-BN particles with lamination structure." Ceramics International 41.9 (2015): 10512-10519.*
Yi, et al. "A fluid dynamics route for producing graphene and its analogues," Cin. Sci. Bull. (2014); 59(16): 1794-1799.
International Search Report and Written Opinion for PCT/IB2016/057108 dated Feb. 10, 2017.
Shen et al., "Preparation of graphene by jet cavitation," Nanotechnology, 2011, 22(36): 365306.
Li et al., "Experimental study on a designed jet cavitation device for producing two-dimensional nanosheets," Sci China Tech Sci, 2012, 55: 2815-2819.
Yi et al., "Morphology and structure of mono- and few-layer graphene produced by jet cavitation," Appl. Phys. Ltrs., 2011, 99: 123112.
Yi et al., "Hydrodynamics-assisted scalable production of boron nitride nanosheets and their application in improving oxygen-atom erosion resistance of polymeric composites," Nanoscale, 2013, 5: 10660-10667.
Yoon et al., "Controlling exfoliation in order to minimize damage during dispersion of long SWCNTs for advanced composites," Scientific Reports, 2014, 4:3907.

* cited by examiner

EXFOLIATION OF LAYERED MATERIALS BY WET-JET MILLING TECHNIQUES

CROSS-REFERENCE TO RELATED APPLICATION

This application is the 35 U.S.C. § 371 national stage application of PCT Application No. PCT/IB2016057108, filed Nov. 24, 2016, where the PCT claims the priority to and benefit of Italian Patent Application No. 102015000077259, filed Nov. 26, 2015, both of which are herein incorporated by reference in their entireties.

This invention relates to processes for exfoliating layered materials, and more specifically processes for exfoliating layered material by fluid dynamic means, in particular through liquid jet micronization techniques, more commonly known as wet-jet milling techniques.

In particular the invention relates to a system for exfoliating layered materials and a method for exfoliating layered materials.

The exfoliation of materials having a layered crystal habit, such as for example graphite, boron nitride, tungsten (IV) disulfide, tungsten (IV) diselenide, molybdenum disulfide, bismuth telluride and black phosphorus, is a difficult procedure in the context of both basic and applied research and in the context of industrial production associated with the technical field of the fabrication of two-dimensional materials.

Mechanical exfoliation of layered materials is one widely used technique for obtaining two-dimensional flakes of high quality. However mechanical exfoliation is unsuitable for mass production, and therefore for industrial applications.

In the context of industrial applications where high yields are required, known liquid phase exfoliation techniques may satisfy requirements in terms of quality and quantity of material produced.

The most widely used process of liquid phase exfoliation is ultrasonication, which comprises exposing a layered crystal material to acoustic waves, in particular ultrasonic waves, propagated in a collection vessel in which the layered material is dispersed in a liquid phase (commonly referred to as solvent). The choice of the liquid phase is dictated by the properties of the layered material itself, in particular the surface tension of the liquid phase must be comparable to the surface energy of the dispersed layered material. Ultrasonic waves give rise to a cavitation effect in which the bubbles formed are distributed within the masses of layered material (and any flakes which may be obtained from them) and when they implode they generate micro-jets of liquid and shock waves which act suddenly on the surfaces of the material causing compressive stresses along directions normal to the planes of the layers of the material which cause a tensile stress at the interfaces resulting in the desired detachment of sheets of material.

Liquid phase exfoliation by ultrasonication produces a heterogeneous mixture of single layer, double layer or multilayer flakes and a large amount of unexfoliated layered material. Disadvantageously, because ultrasonication is a violent process, it gives rise to local high temperatures (of the order of thousands of degrees K), extreme pressures (thousands of atmospheres) and steep local heating/cooling gradients, which are responsible for deterioration of the material produced, in particular breaking up of the flakes produced, as a result of which this technique is unsuitable for producing flakes with large surface dimensions, for example of hundreds of micrometers.

It has been established experimentally that in an exfoliation process by ultrasonication the yield by mass between the starting material and the final product is very much lower than 10%. In addition to this the process of ultrasonication requires a very long time, from a few minutes to hundreds of hours, and continuous control of temperature because the treated material is exposed to high local heating.

Another disadvantage of the process of ultrasonication lies in its unsuitability in that it produces flakes of material which are prone to oxidation, and which therefore require a controlled atmosphere for the production/process.

To overcome the disadvantages of the technique of ultrasonication, liquid phase exfoliation techniques of the fluid dynamic type, in particular for the exfoliation of large volumes of graphite, have recently been explored.

In fluid dynamic exfoliation techniques the volumes of layered precursor material are freely immersed in a dispersing liquid phase, commonly referred to as a solvent, and repeatedly exfoliated in different positions and orientations through the effect of the hydrodynamic forces exerted by the flow of the liquid phase. These techniques are intrinsically different from the ultrasonication technique and potentially efficient for the production of two-dimensional flakes of layered material on an industrial scale, in particular for the production of graphene flakes starting from graphite.

In general, known fluid dynamic milling techniques do not achieve effective exfoliation of layered materials and although they can be made suitable for production on an industrial scale they cannot be regarded as being valid alternative processes to ultrasonication for the production of high quality nanometer sized two-dimensional flakes (that is flakes having a single layer of atoms or a few layers of atoms). These techniques cannot be used to obtain the materials necessary for particular technological applications, such as for example graphene flakes for the formulation of inks.

Among fluid dynamic exfoliation techniques, the wet-jet milling technique, or micronization by liquid jets, is widely used for the colloidal homogenisation of bulk (nano)materials or for reducing them to powder, and is successfully used industrially in grinding or dispersion processes.

Examples of high pressure liquid jet milling equipment include instruments which are commercially available and known by the name of "Nanomaker" (manufactured by Advanced Nanotechnology Co., Ltd), "Nanomizer" (manufactured by Nanomizer Inc.), "Nanomizer" (manufactured by Yoshida Kikai Co. Ltd.) and "Nano Jet Pal" (manufactured by Jokoh Co. Ltd.).

The article "*A fluid dynamics route for producing graphene and its analogues*", by Min Yi, Zhigang Shen and Jinyang Zhu, which appeared in Chinese Science Bulletin 59(16) 2014, pages 1794-1796, describes a fluid dynamic technique for the large scale production of graphene and similar two-dimensional materials in which volumes of layered materials such as graphite, boron nitride, molybdenum disulfide and tungsten disulfide are exfoliated into single monoatomic layers or structures which are still two-dimensional but include a few layers of atoms.

A multiplicity of fluid dynamic phenomena are responsible for exfoliation, including cavitation, which generates forces normal to the planes of the layered material, shear forces induced by the viscosity of the dispersing phase, which give rise to forces coplanar with the planes of the layered material, and turbulence caused by interaction of the fluid jets, which give rise to lateral forces acting parallel to the planes of the layered material.

The exfoliation of graphite through wet-jet milling techniques is carried out in open cycle and is not optimised to reduced defects in the flakes, and to increase the relatively low yield, of the order of 10%.

The object of this invention is to overcome the disadvantages of the known art and to provide a process for exfoliating layered materials which makes it possible to obtain flakes of minimum thickness, down to the limit of single atoms, and large lateral dimensions (of the order of micrometers) and/or surface dimensions (tens of square micrometers).

In particular, one object of this invention is to optimise the wet-jet milling technique through controlling the fluid dynamic phenomena responsible for exfoliating the material, in particular to reduce the turbulence in the liquid phase which in the known art causes undesired cavitation processes that contribute to reduce the lateral dimensions of the two-dimensional flakes produced.

Another object of the invention is to provide equipment for implementing an optimized fluid dynamic exfoliation process, adapted to make it possible to produce two-dimensional flakes of material on a large scale for industrial requirements, with control of the lateral and/or surface dimensions of the flakes.

In accordance with this invention these objects are accomplished through an exfoliation system having the characteristics claimed in claim 1.

A further subject of the invention is an exfoliation method as claimed.

Particular embodiments are the subject of the corresponding dependent claims, the contents of which are to be understood to constitute an integral part of this description.

To sum up, this invention is based on the principle of causing exfoliation of a layered material for the production of two-dimensional materials, such as for example graphene, boron nitride, phosphorene (a monoatomic layer of black phosphorus), transition metal di- and tri-chalcogenides (among which mention may be made for example of tungsten (IV) disulfide, tungsten (IV) diselenide, molybdenum disulfide, bismuth telluride), by fluid dynamic means, applying a liquid jet micronization technique (wet-jet milling) to a mixture of layered material in a predetermined dispersing phase and controlling the physical-chemical parameters of the dispersing phase and the fluid dynamic parameters of the mixture to achieve controlled exfoliation and the desired lateral dimensions of the two-dimensional flakes.

Contrary to other exfoliation techniques, the liquid jet micronization technique has proved to be adapted to continuous cycle production of two-dimensional flakes from layered material and may be applied to the exfoliation of a large quantity of flakes of material thus representing an extremely useful technique for extending the processing of such materials on an industrial level.

During the exfoliation process it is essential to be able to effectively transfer energy from the liquid medium to the layered material being processed so as to be able to exfoliate it, at the same time minimising fractures in the basal plane. Use of the liquid jet micronization technique (wet-jet milling) to generate the necessary exfoliation forces makes it possible to exfoliate two-dimensional flakes of nanometer dimensions from a volume of precursor material (dimensions of the order of hundreds of micrometers), dispersing them in a dispersing phase without compromising physical-chemical and (opto)electronic properties.

The exfoliation method according to the invention comprises a first step of preparing a mixture (a dispersion) of a precursor layered material with a suitable dispersant fluid phase, and a subsequent step of exfoliating the aforesaid material by exposure to one or more cycles of wet-jet milling in a milling device capable of generating hydrodynamic forces in the mixture through compression of the dispersant fluid phase. Finally, the exfoliated material undergoes a purification step comprising possible centrifuging, and separation from the dispersant phase, for example by sedimentation, a process which allows to select flakes on the basis of their lateral dimensions.

The number of milling cycles, that is the number of times the mixture of precursor material in the dispersant phase passes through the milling device is first determined on the basis of the nature and quantity of the layered material which has to be treated, i.e. its concentration in the dispersant phase, and on the basis of the dispersant phase itself.

Advantageously the method according to the invention can be wholly automated in a continuous cycle processing/production line comprising an exfoliation station and a collecting station downstream from the exfoliation station, operating in parallel on different volumes of dispersions, respectively a dispersion of precursor material and a dispersion of (at least partly) exfoliated material, and connected together by means of a path for fluid communication. In a processing operating configuration in which the communication path between the stations is closed, the exfoliation station subjects the corresponding dispersion of precursor material to a process of wet-jet milling in a continuous cycle, and in parallel the collecting station subjects the corresponding dispersion of (at least partly) exfoliated material to possible centrifugation and to separation from the dispersant phase, conveniently by sedimentation. In a configuration for feed/discharge of the material in which the communication path between the stations is open, the exfoliation station is fed with new precursor material from a supply container, and in parallel delivers the previously milled volume of dispersion to the collecting station.

Even more advantageously, the method and equipment according to the invention have proved suitable for processing materials requiring a controlled atmosphere, where exposure to the open air would be likely to compromise their physical-chemical properties.

The choice of dispersant phase (density, viscosity) and concentration of the dispersed phase, and the structure of the milling device and the compression parameters it uses to generate the hydrodynamic forces responsible for exfoliation make it possible to achieve controlled exfoliation of the layered material, but without it breaking up, because exfoliation forces sufficient to break the weak van der Waals electrostatic bonding forces established between the layers of the precursor material, but insufficient to break the covalent bonds established within each layer are generated.

The choice of dispersant phase used for the exfoliation and dispersion processes is determined by the physical-chemical properties of the layered materials which have to be exfoliated. In particular, surface tension, or the Hansen solubility parameters of the dispersant phase, must be close to the corresponding parameters specific to the material being exfoliated.

Further characteristics and advantages of the invention will be set out in greater detail in the following detailed description of an embodiment provided by way of a non-limiting example with reference to the appended drawings in which.

Figure 1:
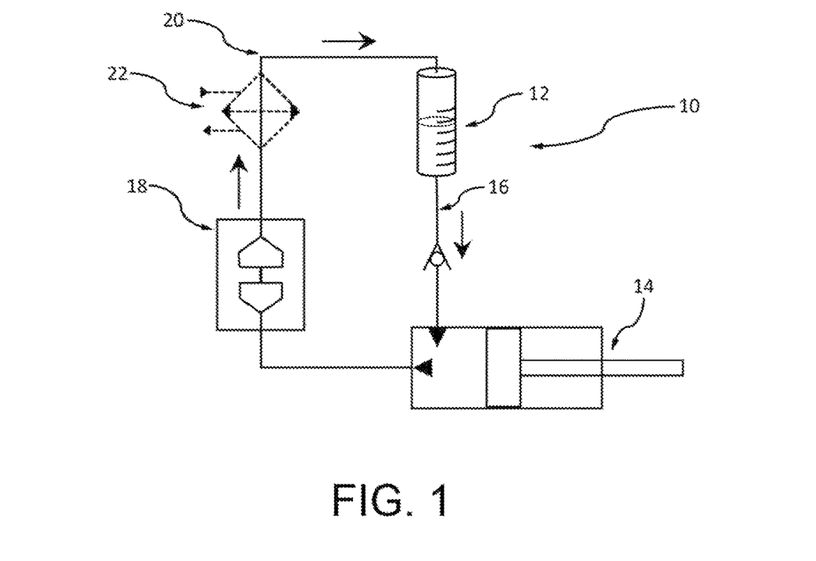
FIG. 1 is a diagrammatical illustration of a milling device used to implement the method according to the invention.

FIG. 1 illustrates diagrammatically a wet-jet milling device 10 comprising a supply chamber 12 adapted to contain a mixture of layered material in a predetermined dispersant phase, compression means 14 connected to said supply chamber 12 through feed duct 16 and milling means 18 located downstream from the compression means and connected through an outlet duct 20 to supply chamber 12 so as to form a recycling path, in which the compression means are arranged to compress a predetermined volume of the mixture drawn from the supply chamber in a duct having a first compression section towards the milling means. A heat exchanger 22 may advantageously be present on duct 20 to control the temperature of the dispersion downstream from the milling means itself.

The milling means comprise a plurality of fluid paths adapted to guide the mixture injected by the compression means at high pressure into ducts of smaller cross-section with respect to the first compression section, giving rise to one or more linear jets which are conveyed towards at least one collision section, in which movement of the layered material in the fluid and collisions between the fluid jets give rise to exfoliation of the material.

Figure 2A:
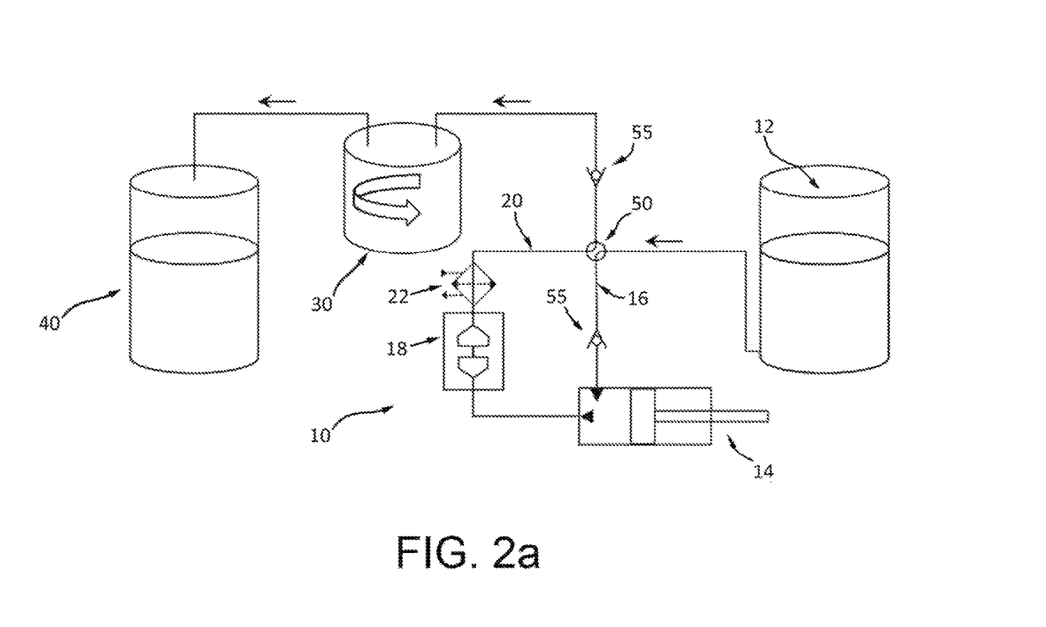
FIGS. 2A and 2B are diagrammatical illustrations of an exfoliation device adapted to be used in a continuous cycle production line, and show two different steps in the method, respectively.
Figure 2B:
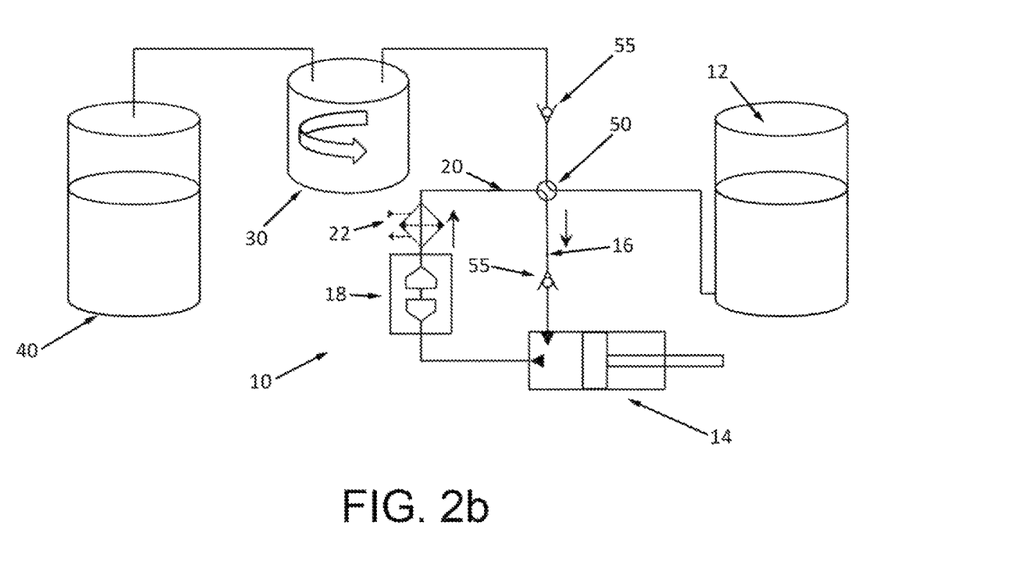

FIGS. 2A and 2B show details of an exfoliation device according to the invention including a wet-jet milling device of the type illustrated and discussed with reference to FIG. 1, in which elements or components which are the same or functionally equivalent to those illustrated in FIG. 1 above have been indicated using the same reference numbers already used in the description for that figure.

Unlike the simplified diagram in FIG. 1, the wet-jet milling device is incorporated in a continuous cycle exfoliation equipment including a separation chamber 30 downstream of the milling device to separate treated material from the dispersant phase, and a collection chamber 40 for the treated material.

Feed duct 16 and outlet duct 20 of the milling device have in common flow regulating means such as a 4-way distribution valve 50 adapted to adopt one of two predetermined configurations, a first open circuit configuration and a second closed circuit configuration respectively.

In the first open circuit configuration adopted during a step of feeding/discharge of the material, feed duct 16 emerging from supply chamber 12 is connected to compression means 14 of the milling device through distribution valve 50. At the same time outlet duct 20 emerging from milling means 18 is connected via distribution valve 50 to separating means 30, which in the preferred embodiment are purification and sedimentation means such as centrifuging means, to separate out the material exfoliated in this way from the dispersant phase.

Activation of compression means 14 makes it possible to pump the dispersion containing the treated material from the milling device to separation means 30 at the end of the cycle and at the same time to feed the milling means with a dispersion containing further material requiring treatment—in a further cycle—through drawing it from supply chamber 12.

In the second closed circuit configuration, adopted during the step of processing the material, outlet duct 20 emerging from milling means 18 is connected to compression means 14 via distribution valve 50 in a recycling configuration in which the path to separating means 30 is interrupted in order to allow a predetermined number of continuous exfoliation cycles to be performed on the same volume of dispersion.

After the material has been treated, that is when a satisfactory predetermined condition of exfoliation of the material has been achieved, or a predetermined number of cycles has been performed, distribution valve 50 is again switched to the first open circuit configuration adopted in a step of feeding/discharge of the material, and the sequence of steps described above is repeated.

Preferably non-return valves 55 located along the paths from supply chamber 12 to compression means 14 and from milling means 18 to separating means 30 are also indicated in the figures.

Of course, as will be clear to those skilled in the art, embodiments also included within the scope of this invention may include valve systems other than the 4-way distribution valve described above, for example assemblies of several T-valves synchronously controlled in a suitable way.

In implementing the method according to the invention a mixture or dispersion of layered material in a predetermined dispersant phase is prepared according to a predetermined concentration ratio by weight, preferably from 1 to 5%.

More specifically, one or more volume blocks of layered material requiring to be exfoliated, typically having sides of between 10 and 5000 µm, preferably between 100 µm and 5000 µm, are placed in a dispersion (or properly a colloidal suspension) in which the dispersant phase is predetermined on the basis of the physical-chemical properties of the layered material. The dispersant phase may be selected from a great variety of liquid phases to appropriately regulate the rheological properties of the two-dimensional materials which will be produced.

The choice of dispersant phase (or dispersant phase mixture) is such that the surface tension of the dispersant phase (or dispersant phase mixture) is close by defect to the surface energy of the layered material which has to be exfoliated, preferably 30 mN/m (or 30 mJ/m$^2$) less than the surface energy of the material. Stable dispersions require the free Gibbs energy of the mixture, $\Delta G_{mix}$, to be negative or zero:

$$\Delta G_{mix} = \Delta H_{mix} - T\Delta S_{mix},$$

where $\Delta H_{mix}$ is the enthalpy of the mixture, T is the temperature and $\Delta S_{mix}$ is the change in entropy during the mixing process.

For example, for the graphene/N-methyl-2-pyrrolidone mixture the change in entropy per unit surface area $\Delta S_{mix}$ has a small value of the order of 0.1 mJ m$^{-2}$ K$^{-1}$. Thus, dispersion and stabilisation of the graphene flakes in a dispersant phase or dispersant phase mixture requires a value of $\Delta H_{mix}$ which is also small.

In addition to this, the values for the surface energy of graphene and the dispersant phase must be quite close together. The relationship converting the surface tension γ of the dispersant phase into the surface energy of the material $E_{Sur}$ with a surface entropy of the dispersant phase $S_{Sur}$ is as follows:

$$\gamma = (E_{Sur} - T \cdot S_{Sur})$$

where $S_{Sur}$ generally has values of between 0.07 and 0.14 mJ m$^{-2}$ K$^{-1}$, a universal value of 0.1 mJ m$^{-2}$ K$^{-1}$ being commonly accepted and used.

Again considering the example of graphene, the value of its estimated surface energy reported in the literature lies within the range between 70 and 80 mJ m$^{-2}$, as a result of which at ambient temperature, using the above value for the surface entropy of the dispersant phase $S_{Sur}$, the ideal dispersant phase should have a surface tension value γ of between 40 and 50 mN m$^{-1}$. Dispersant phases or dispersant phase mixtures useful for implementing the invention must satisfy this value. Dispersant phases or dispersant phase mixtures having a surface tension of between +/−20% of this range, or even more preferably between +/−10% of this range, may be effectively used for the exfoliation of graphite into graphene.

The same considerations apply to all layered materials that have to be exfoliated by fluid dynamic means in a dispersant phase or dispersant phase mixture, with regard to the appropriate values of $E_{Sur}$ and $S_{Sur}$.

Dispersant phases or dispersant phase mixtures may also be selected on the basis of Hansen solubility parameters (HSP).

Hansen solubility parameters subdivide the total cohesion energy of a liquid into three independent interacting parameters which describe (a) the energy deriving from the dipolar intermolecular force between molecules ($\partial_p$), (b) the energy deriving from the dispersion forces between molecules ($\partial_D$) and (c) the energy originating from the hydrogen bonds between the molecules or electron exchange parameter ($\partial_H$), respectively.

Selection of the dispersant phase or dispersant phase mixture is therefore dictated by the match between the Hansen solubility parameters for the dispersant phase and that of the material which has to be exfoliated. In particular, an ideal dispersant phase or dispersant phase mixture for dispersing a material is a dispersant phase or dispersant phase mixture having Hansen solubility parameters within the Hansen space (Hansen coordinates for the dispersant phase) closest to the Hansen coordinates for the material. Consequently, the smaller the Hansen distance between the Hansen coordinates for the dispersant phase or dispersant phase mixture and the Hansen coordinates for the material, the greater will be the interaction between the dispersant phase and the layered material.

This relationship can be expressed by the following equation:

$$r^2 = (\partial_{DSolvent} - \partial_{DMaterial})^2 + (\partial_{PSolvent} - \partial_{PMaterial})^2 + (\partial_{HSolvent} - \partial_{HMaterial})^2$$

where, in order to obtain optimum interaction between the dispersant phase and material, r should lie within the range 0 to 20 MPa$^{1/2}$, preferably within the range from 0 to 10 MPa$^{1/2}$, preferably within the range from 0 to 5 MPa$^{1/2}$.

For example, the surface tension of the dispersant phase used to exfoliate graphite into graphene lies between 22.5 and 67.5 mN/m, preferably between 27 and 63 mN/m, even more preferably between 36 and 54 mN/m, advantageously between 40.5 and 49.5 mN/m, more specifically around 45 mN/m, or, in a wholly equivalent way, the Hansen solubility parameters, $\partial_p$, $\partial_D$, $\partial_H$, for the dispersant phase lie between 9 and 27 MPa$^{1/2}$, 5 and 15 MPa$^{1/2}$, 3.5 and 10.5 MPa$^{1/2}$ respectively, preferably between 12.6 and 23.4 MPa$^{1/2}$, 7 and 13 MPa$^{1/2}$, 4.9 and 9.1 MPa$^{1/2}$, respectively, even more preferably between 14.4 and 21.6 MPa$^{1/2}$, 8 and 12 MPa$^{1/2}$, 5.6 and 8.4 MPa$^{1/2}$ respectively, advantageously between 16.2 and 19.8 MPa$^{1/2}$, 9 and 11 MPa$^{1/2}$, 6.3 and 7.7 MPa$^{1/2}$ respectively, more specifically are around $\partial_p$=18 MPa$^{1/2}$, $\partial_D$=10 MPa$^{1/2}$ and $\partial_H$=7 MPa$^{1/2}$ respectively.

The procedure is similar for other materials.

For example, in the case of molybdenum disulfide (MoS$_2$), the surface tension of the dispersant phase used to exfoliate the three-dimensional crystal into thin flakes must lie between 12.5 and 67.5 mN/m, preferably between 15 and 63 mN/m, even more preferably between 20 and 54 mN/m, advantageously between 22.5 and 49.5 mN/m, even more advantageously between 25 and 45 mN/m, or, the Hansen solubility parameters $\partial_p$, $\partial_D$, $\partial_H$, of the dispersant phase lie between 8.5 and 28.5 MPa$^{1/2}$, 3 and 18 MPa$^{1/2}$, 2.2 and 12.7 MPa$^{1/2}$ respectively, preferably between 11.9 and 24.7 MPa$^{1/2}$, 4.2 and 15.6 MPa$^{1/2}$, 3.1 and 11 MPa$^{1/2}$ respectively, even more preferably between 13.6 and 22.8 MPa$^{1/2}$, 4.8 and 14.4 MPa$^{1/2}$, 3.6 and 10.2 MPa$^{1/2}$ respectively, advantageously between 15.3 and 20.9 MPa$^{1/2}$, 5.4 and 13.2 MPa$^{1/2}$, 4 and 9.3 MPa$^{1/2}$ respectively, even more advantageously within the following ranges $\partial_p$=17-19 MPa$^{1/2}$, $\partial_D$=6-12 MPa$^{1/2}$ and $\partial_H$=4.5-8.5 MPa$^{1/2}$.

In the case of tungsten disulfide (WS$_2$), the surface tension of the dispersant phase used to exfoliate the three-dimensional crystal into thin flakes must lie between 20 and 67.5 mN/m, preferably between 28 and 58.5 mN/m, even more preferably between 32 and 54 mN/m, advantageously between 36 and 49.5 mN/m, even more advantageously between 40 and 45 mN/m, or the Hansen solubility parameters $\partial_p$, $\partial_D$, $\partial_H$, of the dispersant phase lie between 8 and 27 MPa$^{1/2}$, 2.5 and 21 MPa$^{1/2}$, 1 and 28.5 MPa$^{1/2}$ respectively, preferably between 12.8 and 21.6 MPa$^{1/2}$, 4 and 16.8 MPa$^{1/2}$, 1.6 and 22.8 MPa$^{1/2}$ respectively, even more preferably between 14.4 and 19.8 MPa$^{1/2}$, 4.5 and 15.4 MPa$^{1/2}$, 1.8 and 20.9 MPa$^{1/2}$ respectively, and advantageously within the following ranges $\partial_p$=16-18 MPa$^{1/2}$, $\partial_D$=5-4 MPa$^{1/2}$ and $\partial_H$=2-19 MPa$^{1/2}$.

In the case of hexagonal boron nitride (BN), the surface tension of the dispersant phase used to exfoliate the three-dimensional crystal into thin flakes must lie between 15 and 60 mN/m, preferably between 21 and 52 mN/m, even more preferably between 24 and 48 mN/m, advantageously between 27 and 44 mN/m, even more advantageously between 30 and 40 mN/m, or, the Hansen solubility parameters $\partial_p$, $\partial_D$, $\partial_H$, of the dispersant phase lie between 8.5 and 28.5 MPa$^{1/2}$, 2 and 15 MPa$^{1/2}$, 2 and 15 MPa$^{1/2}$ respectively, preferably between 11.9 and 24.7 MPa$^{1/2}$, 2.8 and 13 MPa$^{1/2}$, 2.8 and 13 MPa$^{1/2}$ respectively, even more preferably between 13.6 and 22.8 MPa$^{1/2}$, 3.2 and 12 MPa$^{1/2}$, 3.2 and 12 MPa$^{1/2}$ respectively, advantageously between 15.3 and 20.9 MPa$^{1/2}$, 3.6 and 11 MPa$^{1/2}$, 3.6 and 11 MPa$^{1/2}$ respectively, even more advantageously within the following ranges $\partial_p$=17-19 MPa$^{1/2}$, $\partial_D$=4-10 MPa$^{1/2}$ and $\partial_H$=4-10 MPa$^{1/2}$.

The exfoliation process is carried out by wet-jet milling, setting the operating parameters for the compression means of the milling device and programming the number of compression paths to ensure that all the layered material is milled a sufficient number of times to achieve the desired (total or almost total) exfoliation.

It is important to control the pressure exercised by the compression means on the dispersion so as to avoid or at least limit excessive accelerations of the dispersion in the ducts of the milling means. These accelerations would cause turbulence in the collision section which would give rise to undesired cavitation effects.

Finally, in order to obtain two-dimensional flakes of high quality, and for specific materials for which flakes having defined lateral dimensions and thicknesses are required, for example for use as inks, after exfoliation it is preferable to separate out the single layer two-dimensional flakes or those with a few layers from thicker ones, for example having a number of layers of more than 20, or to select the dimensions of the exfoliated flakes, i.e. to separate out the small flakes from the large ones.

According to this invention separation of the flakes from the residual precursor material or selection of flakes of desired size and thickness from the flakes obtained by exfoliation of the precursor material is incorporated into the continuous production line carried out using the equipment in FIGS. 2A and 2B.

Advantageously, the flakes are separated out or selected by centrifuging and sedimenting the dispersed two-dimensional materials. In a dispersion which is centrifuged the dispersed material is subject to three forces, the centrifugal force, the buoyancy force and the friction force respectively. The thickest and largest flakes, which are of greater mass, sediment out more quickly than the smaller and thinner flakes, which are therefore lighter. Thus, by adjusting the operating parameters of the centrifuge it is possible to keep dispersed the flakes having the desired lateral dimensions.

At the experimental stage the method which is the subject of the invention was performed in order to produce inks with nano-flakes of graphene, boron nitride, tungsten (IV) disulfide, tungsten (IV) diselenide, molybdenum disulfide, bismuth telluride, and other exfoliatable layered materials, using organic dispersant phases such as for example N-methyl-2-pyrrolidone (NMP), dimethylformamide (DMF), alcohol, water with added non-ionic and anionic surfactants, and mixtures of alcohol and water, but not only these.

Figure 3:
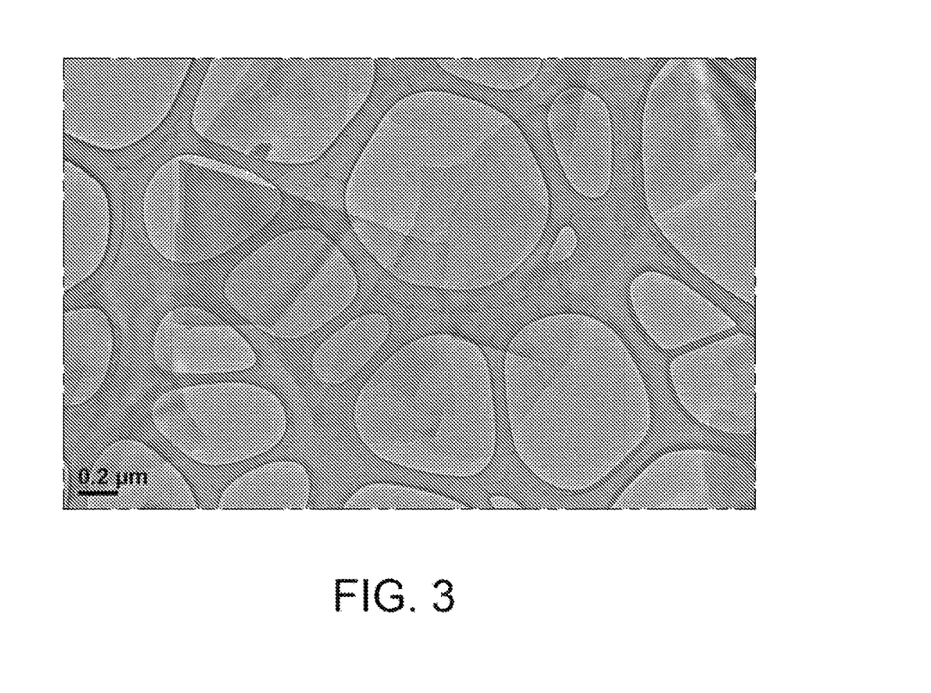
FIG. 3 shows an electron microscope image of exfoliated flakes obtained by the method according to the invention.
Figure 4:
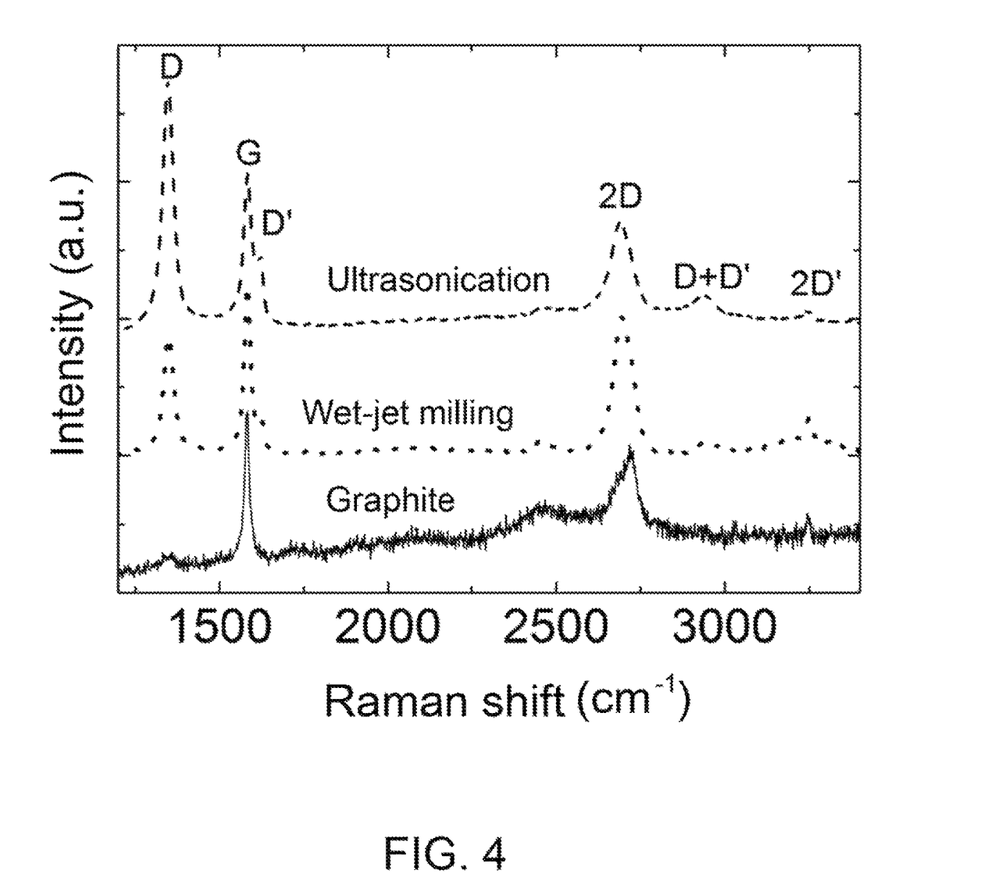
FIG. 4 is a diagram illustrating a comparison between the Raman spectra of graphite, of graphene inks obtained using an ultrasonication process and of graphene inks obtained by means of the method according to the invention.

With reference to FIGS. 3 and 4, the results achieved from the exfoliation of a layered material for the production of nano-flakes of two-dimensional material, in particular in the exfoliation of graphite in NMP dispersant phase, are illustrated below.

The dispersion of graphite in NMP was placed in the supply chamber of the exfoliating equipment illustrated in FIG. 2. The operating parameters for the compression means of the milling device were set within the range between 10 and 300 MPa, and preferably at 200 MPa, and a number of compression paths of between 50 and 250, preferably 250, was programmed. Of course, different values may be possible depending upon the concentration of the material in the dispersion, given that with an increased number of cycles the quantity of exfoliated material consequently increases, and also upon the type of milling device used, in particular the diameter of the tubes in the milling device, which may lie within the range between 0.05 and 1 mm, and preferably between 0.15 and 0.28

To separate out the still dispersed two-dimensional flakes obtained, the mixture resulting from the milling process was transferred directly to a separating chamber, in the specific instance an ultracentrifuge, and subsequently centrifuged, for example at 8000 g for 10 minutes at a temperature of 20° C. These process parameters may be modified over a wide range of acceleration, for example from 100 to 1,000,000 g, a wide range of time, for example between 5 and 120 minutes, and a wide range of temperature, for example from 4 to 30° C., depending upon the rheological parameters of the dispersant phase, for example the viscosity, which may be between 0.1 and 25 mPa s.

Although an ultracentrifuge was used to purify the processed material, it being the most appropriate device for carrying out a centrifuging step in a continuous production line, other centrifuging techniques such as for example decanter, disc stack, solid bowl or filter tubular and centrifuges may also be used.

After the dispersion had been centrifuged, the floating material (supernatant) was drawn off from the collection chamber, at separate times, to select flakes having different lateral, surface and thickness dimensions, and these were characterised.

The dispersions obtained may be characterised by means of optical absorption and Raman spectroscopy techniques, as well as by analysis using a transmission electron microscope. In particular, optical absorption spectroscopy is used to determine the concentration of two-dimensional flakes in the dispersant phase, Raman spectroscopy is used to determine the number of layers and structural quality, i.e. the presence of defects, doping, etc., while electron microscope analysis is used to determine the lateral and surface dimensions of the flakes so produced. Of course, other characterisation techniques such as for example X-ray photoemission, X-ray diffraction, scanning electron microscopy, atomic strength microscopy, etc., may be used to characterise the dispersions obtained.

FIG. 3 shows a low resolution image of graphene flakes from a transmission electron microscope.

From examination of the image it is possible to estimate the lateral dimensions of the exfoliated nano-flakes to be between 100 nm and 10 μm, with a number of layers of less than 6. Flakes having smaller lateral dimensions may be produced by modifying the milling conditions, that is the pressure, the diameter of the tubes in the milling device and the number of cycles, as well as the centrifuging parameters.

FIG. 4 illustrates the Raman spectrum at an excitation wavelength of 532 nm of graphene flakes deposited from different graphene inks, including an ink obtained through the wet-jet milling process according to the invention and an ink obtained using an ultrasonication process according to the known art, deposited on $Si/SiO_2$, together with the Raman spectrum for graphite. The ink including graphene flakes obtained by the wet-jet milling technique shows a combination of two-dimensional flakes having a single layer or a few layers.

As may be seen from the diagram, compared with an ink obtained by ultrasonication, the $I(D)/I(G)$ ratio, which indicates the presence of defects at the edges and in the basal plane, is lower in the sample obtained by exfoliation by wet-jet milling, where $I(D)/I(G)=0.8$, than in the sample obtained by exfoliation by ultrasonication, where $I(D)/I(G)=1.2$. This result proves that the graphene ink produced by a wet-jet milling technique is of better quality than that produced by ultrasonication.

By way of experiment inks with the two-dimensional nano-flakes so obtained were deposited onto glass using a drop casting deposition process and the electrical properties of the graphene flakes produced by the wet-jet milling technique were measured. A sheet resistance of the order of 5 Ω/☐ was obtained.

Advantageously, the steps of feeding the layered material and discharging the exfoliating material can be wholly automated, thus achieving a significant reduction in production times and costs, and the exfoliation method described above can be carried out in a closed continuous cycle production line, under a controlled atmosphere, offering the possibility of processing two-dimensional materials like black phosphorus which are sensitive to exposure to air.

Again advantageously, the method according to the invention may be used to prepare inks in large quantities, from several liters to a number of cubic meters, with quite high production rates (liters per hour). The prospect of producing large quantities of two-dimensional materials having different electronic, optical, mechanical and electrochemical properties opens the way to an infinite number of industrial applications, among which mention may be made by way of a certainly non-exhaustive example the manufacture of printable, wearable or in general flexible electronic devices, and protective layers, coatings and energy devices.

There is also the possibility of controlling the rheological properties of the dispersions (that is the viscosity, density and surface tension), thus making it possible to formulate colloidal suspensions of graphene nano-flakes having rheological properties that are useful for technologies of printing or coating onto rigid or flexible substrates, such as for example drop casting, dip casting, rod coating, spray coating, ink jet printing, flexography and silk screen printing technologies, which are used for the manufacture of electronic devices or for the conversion of energy (for example solar cells, fuel cells, thermoelectric cells) or its storage (for example batteries, supercondensers).

Specifically, the equipment and the method according to the invention make it possible to fully process a precursor material and achieve a yield of close to 100%, unlike known exfoliation methods by ultrasonication in which the yield is very much lower, that is 10% if not less.

Of course, without altering the principle of the invention the embodiments and details of implementation may be varied widely from what has been described and illustrated purely by way of a non-limiting example without thereby going beyond the scope of the protection of the invention defined by the appended claims.

The invention claimed is:

1. A system for exfoliating a layered material, comprising in combination:
    an exfoliation station operating on a volume of a dispersion of a layered precursor material, including a wet-jet milling device; and
    a collecting station, arranged downstream of the exfoliation station, operating on a volume of a dispersion of at least partially exfoliated material,
    wherein the exfoliation station and the collecting station are connected to each other through a fluid communication path along which there are interposed flow regulating means,
    said flow regulating means being adapted to assume a first operating configuration in which the communication path between the exfoliation station and the collecting station is discontinued, whereby the exfoliation station is adapted to expose a volume of a dispersion of a layered precursor material to a predetermined number of wet-jet milling cycles, and the collecting station is adapted to extract an amount of exfoliated material from the volume of the dispersion previously exposed to milling and including material at least partially exfoliated; and a second operative configuration in which the communication path between the exfoliation station and the collecting station, is continuous, whereby the exfoliation station is adapted to convey a volume of a dispersion previously exposed to milling and including a material at least partially exfoliated towards the collecting station, and the exfoliation station is placed in connection with a supply chamber so as to be fed with a further volume of a dispersion of a layered precursor material.

2. The system according to claim 1, wherein the dispersion includes a dispersing phase, and wherein the collecting station comprises means for separating exfoliated material from the dispersing phase, including sedimentation means.

3. The system according to claim 1, wherein said wet-jet milling device comprises:
    compression means connected to said supply chamber through a feed duct, arranged for injecting a predetermined volume of a dispersion of layered precursor material from the supply chamber in a duct having a first compression section toward milling means; and
    milling means arranged downstream of the compression means and including a plurality of fluid paths adapted to guide the dispersion injected by the compression means into ducts of smaller section compared with that of the first compression section, thereby generating one or more linear jets which are conveyed towards at least one collision section, wherein free movement of the layered precursor material in the dispersion and the collisions between jets cause exfoliation of the layered precursor material.

4. The system according to claim 3, wherein said flow regulating means comprise a 4-way distribution valve adapted to assume a first configuration in a supply/exhaust phase, wherein the feed duct from the supply chamber is connected to the compression means of the wet-jet milling device and an outlet duct emerging from the milling means is connected to the collecting station; and a second configuration wherein the outlet duct emerging from the milling means is connected to the compression means in a recirculation configuration and the fluid communication towards the collecting station is discontinued.

5. The system according to claim 1, wherein the supply chamber is adapted to contain a dispersion of a layered precursor material in a predetermined dispersing phase selected as a function of said layered precursor material.

6. The system according to claim 5, wherein the predetermined dispersing phase has a surface tension close by defect to the surface energy of the layered precursor material that has to be exfoliated.

7. The system according to claim 5, wherein the predetermined dispersing phase has Hansen solubility parameters close to the Hansen solubility parameters of the layered precursor material in Hansen space.

8. The system according to claim 7, wherein the proximity between the Hansen solubility parameters of the predetermined dispersing phase and the Hansen solubility parameters of the layered precursor material is expressed by the relation $$r^2 = (\partial_{Dsolvent} - \partial_{DMaterial})^2 + (\partial_{Psolvent} - \partial_{PMaterial})^2 + (\partial_{Hsolvent} - \partial_{HMaterial})^2$$

where:
  $\partial_P$ is the energy from the intermolecular dipolar force between molecules,
  $\partial_D$ is the energy from dispersion forces between molecules,
  $\partial_H$ is the energy from hydrogen bonds between molecules or electronic exchange parameter, and
  r is between 0 and 15 $MPa^{1/2}$.

9. The system according to claim 2, wherein the sedimentation means are centrifugal means.

10. The system according to claim 8, wherein r is between 0 and 10 $MPa^{1/2}$.

11. The system according to claim 10, wherein r is between 0 and 5 $MPa^{1/2}$.

12. A method for exfoliating a layered material, comprising the steps of:

providing a dispersion of a layered precursor material; and, iteratively exposing a volume of said dispersion of layered precursor material to a predetermined number of wet-jet milling cycles in an exfoliation station;

subsequently, conveying the dispersion volume previously exposed to milling and including material at least partially exfoliated to a collecting station; and extracting an amount of exfoliated material from the dispersion volume conveyed at the collecting station, in which fluid communication between the exfoliation station and the collecting station is alternately regulated between a first operating phase in which said communication is discontinued, during which a volume of a dispersion of a layered precursor material is exposed to a predetermined number of wet-jet milling cycles at the exfoliation station and an amount of exfoliated material is extracted from a volume of a dispersion previously exposed to milling and including material at least partially exfoliated at the collecting station; and a second operating phase in which said communication is continuous, whereby a volume of a dispersion previously exposed to milling and including at least partially exfoliated material is conveyed from the exfoliation station towards the collecting station, and a further volume of a dispersion of a layered precursor material is fed to the exfoliation station.

13. The method according to claim 12, further comprising separating exfoliated material from a dispersing phase through sedimentation by centrifugation.

14. The method according to claim 12, in which a wet-jet milling cycle includes an injection of a predetermined volume of the dispersion of the layered precursor material to a plurality of fluid paths adapted to guide the dispersion and generate one or more linear jets, in which free movement of the layered precursor material in the dispersion and collisions between jets cause exfoliation of the layered precursor material.

15. The method according to claim 12, in which the dispersion of the layered precursor material is obtained in a predetermined dispersing phase, which has a surface tension close by defect to the surface energy of the layered precursor material that has to be exfoliated.

16. The method according to claim 12, in which the dispersion of the layered precursor material is obtained in a predetermined dispersing phase, which has Hansen solubility parameters close to the Hansen solubility parameters of the layered precursor material in Hansen space.

17. The method according to claim 16, in which the proximity between the Hansen solubility parameters of the predetermined dispersing phase and the Hansen solubility parameters of the layered precursor material is expressed by the relation $$r^2 = (\partial_{solvent} - \partial_{DMaterial})^2 + (\partial_{PSolvent} - \partial_{PMaterial})^2 + (\partial_{HSolvent} - \partial_{HMaterial})^2$$

where:

$\partial_P$ is the energy from the intermolecular dipolar force between molecules, $\partial_D$ is the energy from dispersion forces between molecules, $\partial_H$ is the energy from hydrogen bonds between molecules or electronic exchange parameter, and r is between 0 and 15 MPa$^{1/2}$.

18. The method according to claim 15, in which the layered precursor material is graphite and the predetermined dispersing phase is one among N-methyl-2-pyrrolidone (NMP), dimethylformamide (DMF), alcohol, water added with non-ionic and anionic surfactants, a mixture of alcohol and water.

19. The method according to claim 17, wherein r is between 0 and 10 MPa$^{1/2}$.

20. The method according to claim 19, wherein r is between 0 and 5 MPa$^{1/2}$.

* * * * *